UNITED STATES PATENT OFFICE.

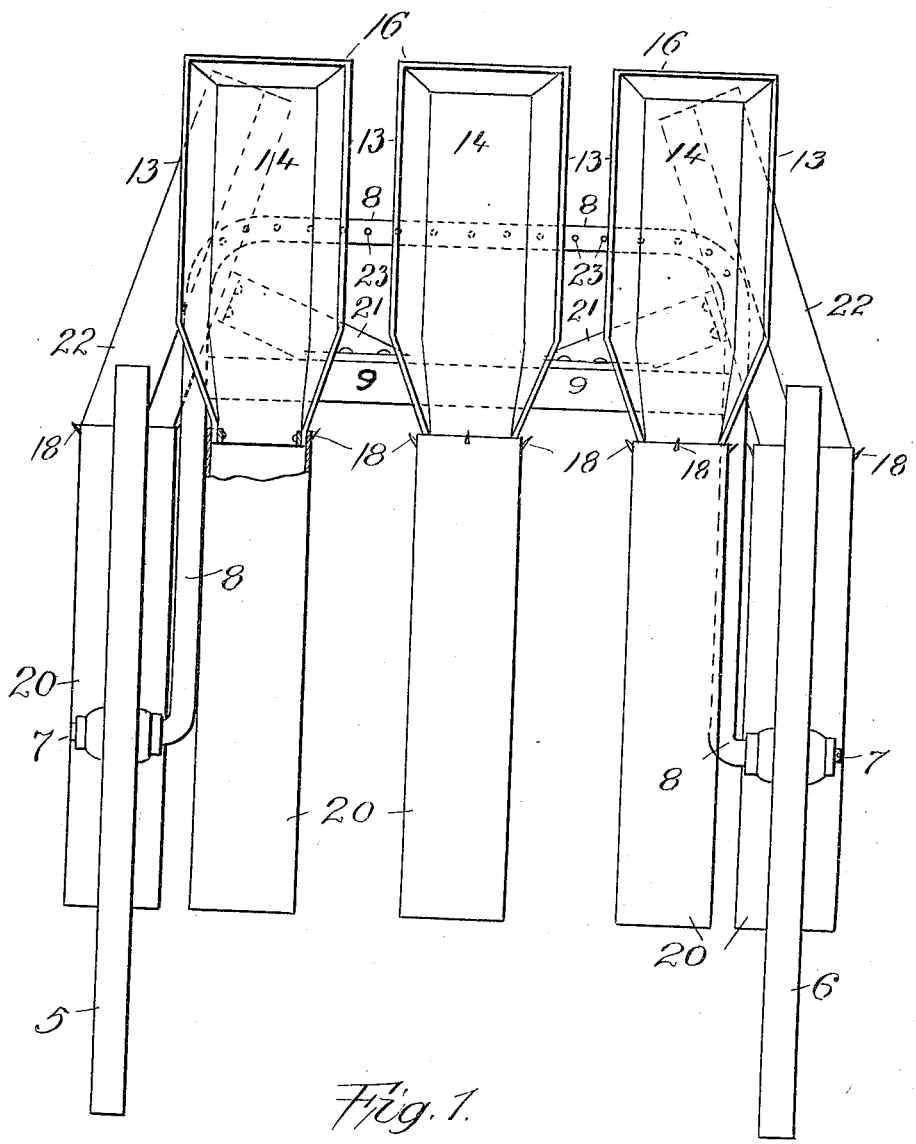

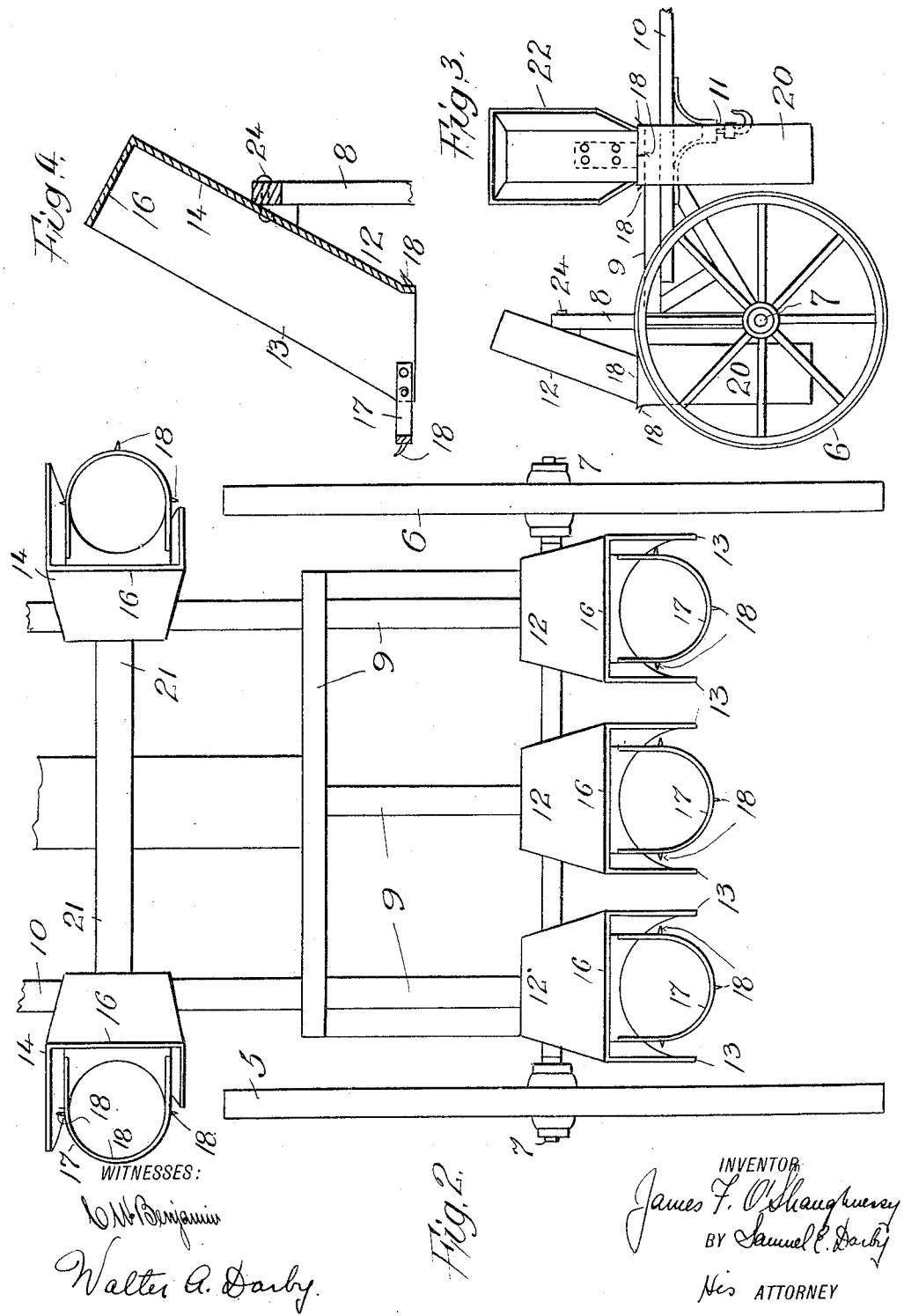

JAMES F. O'SHAUGHNESSY, OF NEW YORK, N. Y., ASSIGNOR, BY MESNE ASSIGN-MENTS, TO COTTON GATHERING CORPORATION, OF NEW YORK, N. Y., A CORPORATION OF DELAWARE.

MACHINE FOR USE IN GATHERING COTTON.

1,103,621.    Specification of Letters Patent.    Patented July 14, 1914.

Application filed August 9, 1913. Serial No. 783,950.

*To all whom it may concern:*

Be it known that I, JAMES F. O'SHAUGH-NESSY, a citizen of the United States, residing at New York, in the county and State of New York, have made a certain new and useful Invention in Machines for Use in Gathering Cotton, of which the following is a specification.

This invention relates to machines for use in gathering cotton.

The object of the invention is to provide a machine which is light, simple, and economical to manufacture, and efficient for use in harvesting cotton.

A further object is to provide a machine of the sulky type, and having means for supporting the bags into which the picked cotton is to be delivered, with means arranged to receive the picked cotton from the hands of the pickers or operators, or into which the picked cotton may be thrown, and arranged to direct the same into the bags.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

Referring to the accompanying drawings, and to the various views and reference signs appearing thereon—Figure 1 is a view in rear elevation of a machine embodying the principles of my invention. Fig. 2 is a top plan view of the same. Fig. 3 is a view in side elevation on a reduced scale. Fig. 4 is a detail view in longitudinal section of a deflecting chute employed to receive the cotton from the hands of the pickers or operators, and to direct the same into the bags.

The same part is designated by the same reference sign wherever it occurs throughout the several views.

The difficulty heretofore experienced in employing machines for relieving the laborers of the fatigue and toil incident to the cotton picking or gathering operation, has been the great weight of the machine and the complicated gearing and operating mechanism employed. It is difficult to handle the large, heavy, cumbersome machines in the field, and the complicated machinery requires the constant care and attention of a skilled mechanic, the ordinary farm laborer not being competent for the purpose. Again, the large heavy machines usually require power engines to move them, thereby introducing additional elements requiring the care and skill of a trained mechanic. Moreover the great cost of construction of large heavy machines places them out of the reach of small farmers. For these and other reasons, machines of this class have not so far, come into very extensive or general use.

It is among the special purposes of the present invention to provide a machine for use in harvesting cotton which is exceedingly simple and economical in structure, and the cost of which is brought within the reach of individual farmers owning or cultivating only small farms.

It is also among the special purposes of the invention to provide a machine for the purpose referred to, which is efficient in that it provides means to receive the cotton, as gathered, from the hands of the laborer, thereby relieving the laborer of the necessity of carrying bags to receive the picked cotton, and which bags not only impose wearisome toil, but fatigue and wear on the laborers by reason of the increasing weight thereof, as the work progresses, but which also hamper the free movements of the laborers in their work, and hence materially decrease their daily capacity or output.

In carrying out my invention I provide a machine of the light sulky pattern, that is, a machine having only two wheels and a light sulky frame supported thereby, with the axle bar arched upwardly so as to enable the supporting wheels to straddle two or more, preferably two, rows of cotton stalks. I also provide the sulky frame with shafts or poles, or other necessary draft appliances by means of which the machine may be pulled or hauled along or through the field by a mule or horse hitched thereto, and handled or operated by the unskilled laborer such as is employed on farms, and without the necessity of employing skilled mechanics or engineers. And I provide the machine with suitably and conveniently arranged directing or guiding chutes into which the picked cotton can be readily thrown by the laborer, as the machine progresses along, and which serves to guide and direct the cotton into bags suspended in position to receive the same from said chutes. These, generally, are the essential characteristic features of the construction which I have shown as an operative embodiment of the principles of my invention.

In the drawing 5, 6, designates the two supporting wheels of the machine. These wheels are journaled on stub axles 7, formed on or carried by the ends of the axle bar 8. The axle bar, between its ends, is arched upwardly and may be of such length as to enable the wheels 5, 6, to span the desired number of rows of cotton stalks, say, for instance, two. Extending forwardly from the axle bar and supported thereby, is the light frame 9, which, if desired may serve as a support for the bags of cotton as they become filled from the deflecting and directing chutes presently to be described. To this frame 9, are connected the shafts or poles 10, and other suitable draft appliances, if desired, as indicated at 11, to afford means for hitching a mule or horse to the machine to haul the same along.

At suitable points on the machine frame I mount the directing chutes 12. These are formed of any suitable material, preferably of thin sheet iron, tin or the like, and have sides 13, and a bottom 14. In practice I prefer to form the sides 13, with a slight outward flare, as shown, but in this respect my invention is not to be limited or restricted in the broadest scope thereof as defined in the claims. I also prefer to provide the chutes with closed upper ends, as indicated at 16. At their lower ends the sides 13, of each chute are converged toward each other to form a delivery mouth, and any suitable or desirable means may be provided for detachably connecting the mouth of a cotton receiving bag 20 over this delivery mouth of the directing chute. I have shown a simple embodiment of the idea, wherein a strap or loop 17, encompasses the mouth of the chute, and said strap as well as the chute, may be provided with hooks, 18, or other suitable engaging devices for receiving and holding the mouth of the cotton receiving bags in position for the cotton thrown into the chute to be directed and to fall into the receiving bag. The chutes are supported vertically upon the frame with the open side or face thereof presented toward the location of the laborers who are to gather or pick the cotton. In practice I prefer to slightly incline the chute upwardly and away from the laborer in order to insure the proper reception and deflection of the picked cotton when thrown into the chute through the open side thereof. The flaring sides of the chute also aid in insuring the reception of the cotton into the chutes when thrown from a distance.

As above indicated, the directing chutes may be positioned at any suitable or convenient point or points on the machine, depending on the desired capacity of the machine. In the particular arrangement shown, to which, however, my invention is not to be limited or restricted, five of such chutes are shown. Three of these are mounted on the axle bar 8, in position to face rearwardly from the machine; while another chute is arranged on each side of the frame and supported therefrom in any suitable or convenient manner, as, for instance, by means of brackets 21. These side chutes preferably face outwardly from the sides of the machine, and, in practice I prefer to extend the forward side of the chute, as indicated at 22, farther outwardly than the rearward side 13 of said side chutes, so that, if desired, the laborers using the side chutes may not be directly opposite the side chutes, but, if necessary, may be slightly to the rear of said chutes. The side chutes are preferably so positioned that the bags 20 depending from the lower ends thereof, may hang down in front of the wheels of the machine and in the same spaces between the same rows of cotton stalks in which the wheels operate. The rear chutes may also be conveniently positioned for the bags depending therefrom to be suspended between adjacent rows of stalks. If desired, the rear chutes may be made adjustable as to their positions transversely of the machine so as to accommodate rows of different widths. This may be accomplished in any convenient way. Merely as illustrative of one arrangement for this purpose, I have shown the axle bar 8, provided with a series of bolt holes 23 into any one of which the bolts 24, see Fig. 4, for supporting the chutes on said bar, may be inserted to secure the desired spacing apart of the chutes.

The operation of the machine is exceedingly simple and will be readily understood. The machine is drawn through the field slowly, or by short stages. The pickers follow the machine, those in the rear of the machine picking the cotton and as they pick the cotton they throw it into the chutes which directs and guides the same into the bags which are supported with their distended mouths encompassing the lower ends of the chutes. The flaring side flanges insure the reception of the cotton into the chutes even when thrown from a distance, and the closed upper ends 16, prevent the cotton from escaping from the chute if thrown with too great a force. The inclination of the chutes away from the laborers permits the force under which the cotton is thrown into the chutes to be expended, after impact with the bottoms of the chutes, without causing a rebound of the cotton from the chute and the consequent liability of its spilling from the chute onto the ground. By thus expending the force of the throw of the cotton it is evident that the cotton, thereafter, slides downwardly by gravity being guided by the directing chute, and falls into the open receiving mouth of the bag. As the bags become filled up the contents thereof may be crowded down by hand until the bag is completely filled when it is detached thrown up on the retaining part 9 of the frame and an empty bag is suspended from the chute in its place. In this manner the laborers follow up the machine as it progresses through the field, and harvest the cotton easily and with minimum physical labor and fatigue. The laborers being entirely free and unhampered in their work are enabled to greatly increase their daily capacity, thereby increasing their daily compensation, while at the same time the harvesting of the crop is effected more satisfactorily, rapidly and quickly than has been possible heretofore. It will also be seen that the same machine may accommodate several laborers at the same time, while each laborer can keep the product of his work separate from that of the other laborers. The use and operation of the side chutes is the same as above described with reference to the rear chutes except that in this case the laborers using them are positioned at the sides instead of at the rear of the machine.

It will be observed that in a machine embodying the principles of my invention I avoid the use of traveling carriers or elevators, or other complicated gearing or machinery. The machine can be made very light and is cheaply constructed at minimum cost. There is nothing about the machine to get out of order or adjustment. The arched axle enables the same and also the filled bag supporting frame 9 to readily pass over the tops of the cotton stalks without injury thereto.

Having now set forth the object and nature of my invention, and a construction embodying the principles thereof, what I claim as new and useful, and of my own invention, and desire to secure by Letters Patent is,—

1. In a machine for use in gathering cotton, a frame, supporting wheels therefor, a directing chute mounted on said frame in vertically inclined position said chute having closed sides and bottom and an open front, and means for suspending a receiving bag over the delivery mouth of said chute.

2. In a machine for use in gathering cotton, a frame, supporting wheels therefor, a chute mounted on said frame and having closed sides and bottom and open front, the open front being presented outwardly from the frame, the sides of said chute being flared and means for suspending a receiving bag over the mouth of said chute.

3. In a machine for use in gathering cotton, a frame, supporting wheels therefor, a chute mounted on said frame in vertically inclined position, and having closed sides and bottom and open front, the open front being presented outwardly from the machine, and means for suspending a receiving bag over the lower delivery mouth of the chute.

4. In a machine for use in gathering cotton, a frame, supporting wheels therefor, a chute mounted on said frame in vertical position, and having closed sides and bottom, and an open front presented away from the machine, the sides of the chute converging toward each other at their lower ends to form a delivery mouth and means for suspending a bag beneath said mouth.

5. In a machine for use in gathering cotton, a frame, supporting wheels therefor, a chute mounted on said frame in vertically inclined position, and having a bottom and sides, and closed at its upper end, the front of said chute being open, and means for suspending a bag beneath the lower delivery mouth of said chute.

6. In a machine for use in gathering cotton, a frame, supporting wheels therefor, a chute mounted on said frame in vertically inclined position, and having a bottom and sides, and closed at its upper end, the front of said chute being opened, and the sides being flared away from each other but converging at their lower ends to form a delivery mouth, and means for suspending a bag beneath said delivery mouth.

7. In a machine for use in gathering cotton, a frame, supporting wheels therefor, a chute mounted on the rear of and having an open front presented rearwardly from said frame, and means for suspending the open mouth of a receiving bag beneath the delivery mouth of said chute.

8. In a machine for use in gathering cotton, a frame, supporting wheels therefor, a chute mounted on the rear of said frame for transverse adjustment thereon, and having an open front presented rearwardly from the machine, and means for suspending a receiving bag from the delivery mouth of said chute.

9. In a machine for use in gathering cotton, a frame, supporting wheels therefor, chutes mounted on the frame at the rear and sides thereof, said chutes having open fronts presented away from said frames, and means for supporting receiving bags at the delivery mouths of said chutes.

In testimony whereof I have hereunto set my hand in the presence of the subscribing witnesses, on this 28th day of July A. D., 1913.

JAMES F. O'SHAUGHNESSY.

Witnesses:
G. A. McGRATH,
WALTER A. DARBY.

Copies of this patent may be obtained for five cents each, by addressing the "Commissioner of Patents, Washington, D. C."